United States Patent
Kesavan

(10) Patent No.: US 7,228,458 B1
(45) Date of Patent: Jun. 5, 2007

(54) STORAGE DEVICE PRE-QUALIFICATION FOR CLUSTERED SYSTEMS

(75) Inventor: Ambujavalli Kesavan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 391 days.

(21) Appl. No.: 10/744,225

(22) Filed: Dec. 19, 2003

(51) Int. Cl.
*G06F 11/00* (2006.01)

(52) U.S. Cl. ............... 714/41; 714/42; 714/43

(58) Field of Classification Search ........... 714/42, 714/41, 43
See application file for complete search history.

(56) References Cited

U.S. PATENT DOCUMENTS

| | | | | |
|---|---|---|---|---|
| 6,074,427 A | * | 6/2000 | Fought et al. | 703/21 |
| 6,438,705 B1 | * | 8/2002 | Chao et al. | 714/4 |
| 6,701,460 B1 | * | 3/2004 | Suwandi et al. | 714/41 |
| 7,058,858 B2 | * | 6/2006 | Wong et al. | 714/42 |
| 2004/0260982 A1 | * | 12/2004 | Bhowmik et al. | 714/43 |

\* cited by examiner

*Primary Examiner*—Michael Maskulinski
(74) *Attorney, Agent, or Firm*—Darby & Darby PC; M. David Ream

(57) ABSTRACT

Methods are provided for testing storage devices and related devices for use in a clustered system. Storage devices may be pre-qualified before cluster software is installed for controlling the clustered system. Some implementations allow one or more storage devices in a cluster to be automatically tested in a variety of fault and non-fault scenarios.

24 Claims, 6 Drawing Sheets

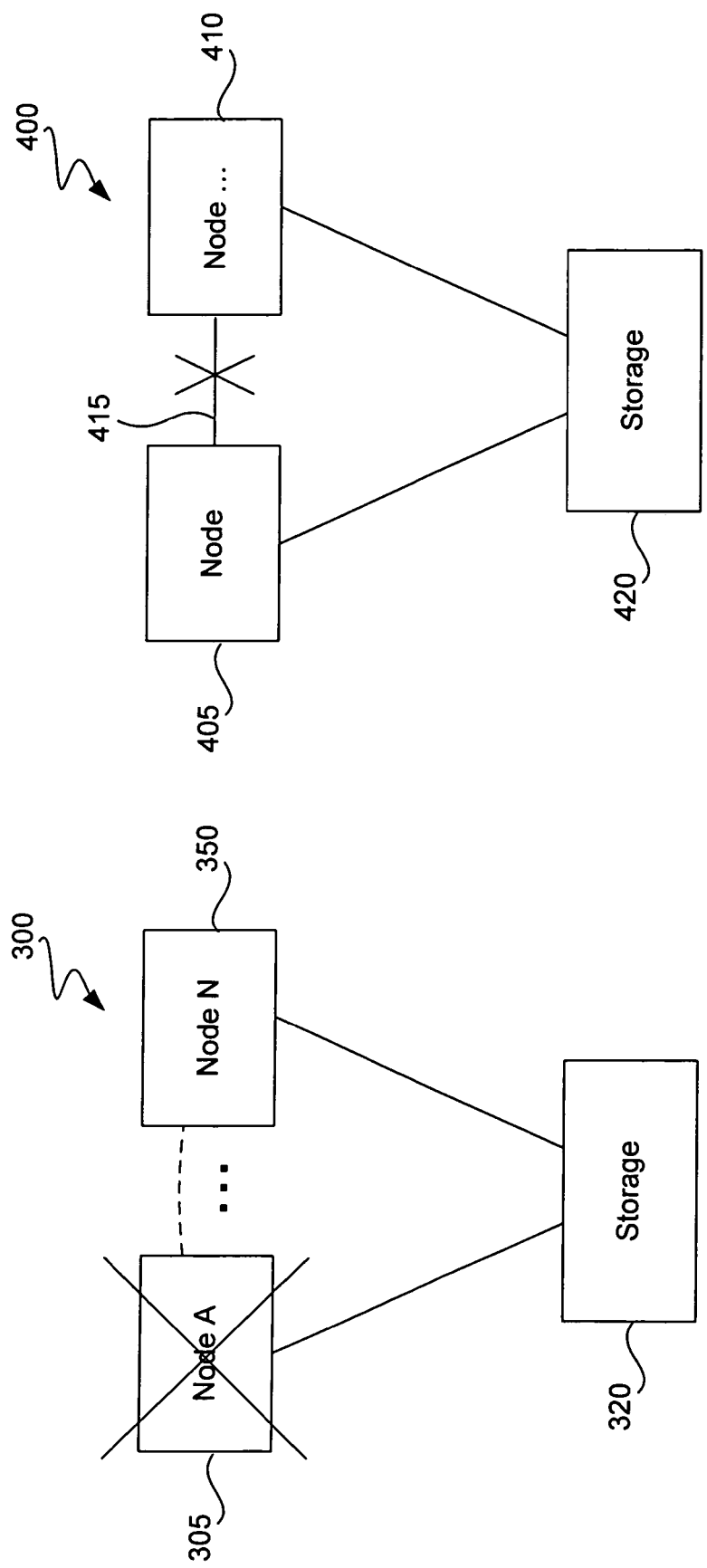

STORAGE DEVICE PRE-QUALIFICATION FOR CLUSTERED SYSTEMS

BACKGROUND

Computing clusters and other distributed computing systems have a number of requirements that go well beyond the requirements of stand alone computing systems. Therefore, when products are developed for use in distributed computing environments, it is typically desirable to test the products for distributed computing environment compatibility in addition to any testing that might be required for use with standalone systems.

To facilitate testing of computer systems, test software (e.g., test programs or test suites) is typically written that is designed to exercise the product to be tested in an environment similar to that in which the product will be used. However, clustering systems tend to be somewhat more complicated than stand alone computing systems and therefore testing a storage device in a fully operational clustered computing environment tends to add complexity to the test system. This added complexity can sometimes make it challenging to isolate the sources of errors. Therefore, it would generally be desirable to be able to pretest storage devices (and their related components) for cluster compatibility without requiring that the tests be executed on a fully functioning computing cluster.

SUMMARY

Methods and devices are provided for testing storage devices and related devices to validate their compatibility for use in a clustered system. These methods and devices allow storage devices to be pre-qualified for cluster compatibility without requiring that the testing be run on a clustered system. Some implementations allow the storage device(s) and related devices to be automatically tested in a variety of fault and non-fault scenarios.

In some embodiments, a common test package is installed on each of the computing nodes in a test system. The test package has a plurality of test suites that are designed to exercise the storage device(s) under different scenarios that simulate events that can occur in a clustered computing environment. The desired test suites are then executed without the computing nodes operating as a cluster. The test package can include any number of test cases. The test cases may be arranged to simulate cluster operations in both fault and non-fault scenarios. The fault scenarios may include node fault scenarios, storage fault scenarios and/or multipathing fault scenarios.

In some embodiments, the test package can be arranged to pre-validate that the tested storage device(s) properly implement an interface. Some such embodiments involve testing one or more SCSI interfaces such as the SCSI-2 and/or SCSI-3 interfaces. Other embodiments involve testing other interfaces, such as IDE, EIDE, etc.

BRIEF DESCRIPTION OF THE DRAWINGS

FIG. 3 is a block diagram of a clustered system having a failed node, according to one embodiment of the invention.

FIG. 4 is a block diagram of a clustered system having a failed connection between two nodes, according to one embodiment of the invention.

DETAILED DESCRIPTION OF EMBODIMENTS OF THE INVENTION

Figure 1:
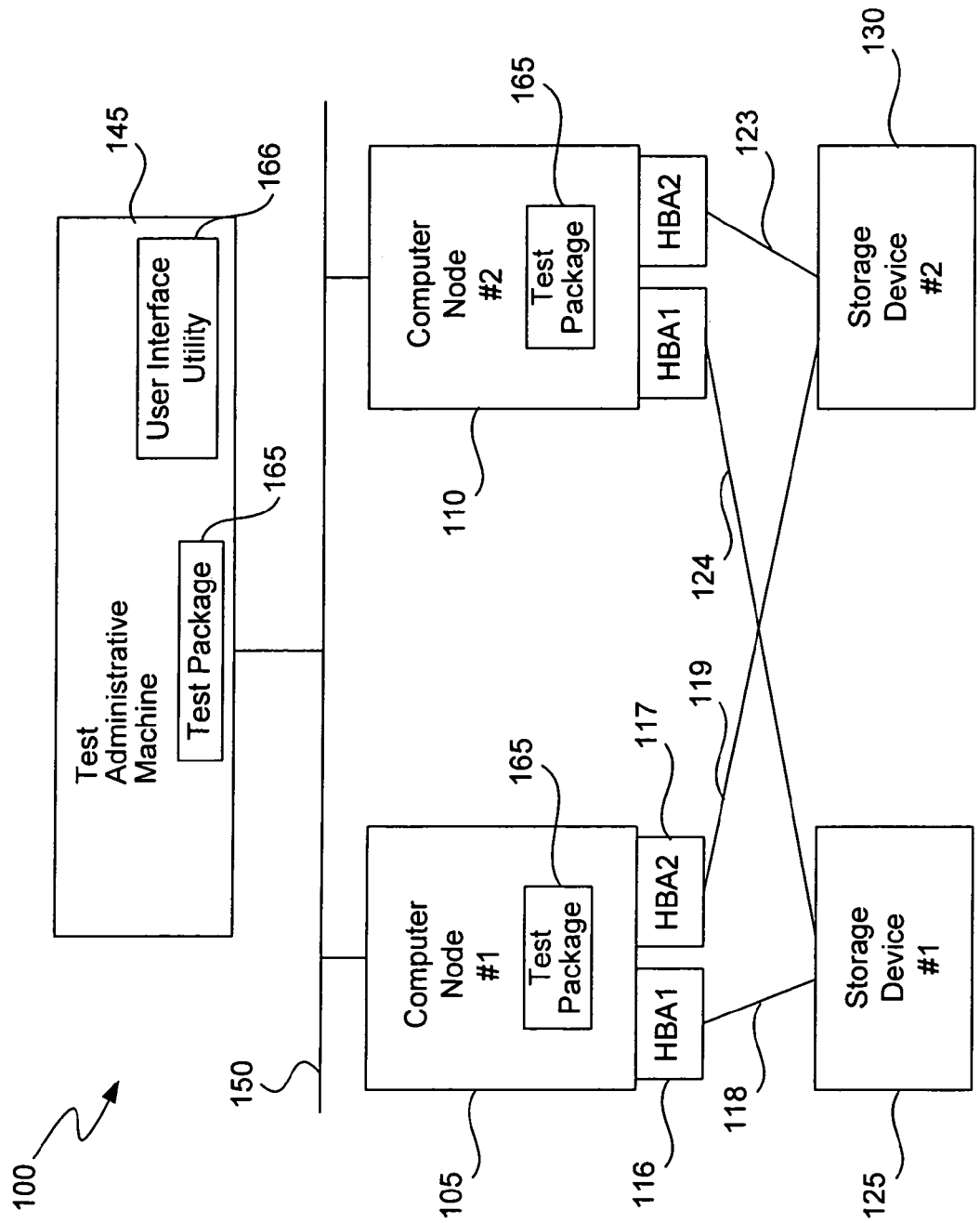
FIG. 1 is a diagram illustrating a configuration of a test system suitable for implementing one embodiment of the present invention.

In the following description, numerous specific details are set forth in order to provide a thorough understanding of embodiments of the present invention. However, it will be obvious to one skilled in the art that the present invention may be practiced without some or all of these specific details. In other instances, well known process steps have not been described in detail in order not to obscure the present invention.

A test package is described that allows a component (such as a storage device) designed for use in a computing cluster, to be pre-qualified for use in a clustering environment, without requiring testing in a fully functioning cluster. The pre-qualification is arranged to simulate cluster based functional and fault scenarios as seen by the component being tested (e.g., the storage device). By simulating cluster based functions and faults in a non-clustered environment, the described test package has the potential to simplify the debugging process by eliminating many of the complexities that are inherent in clustering from the pre-qualification tests. It is generally contemplated that normal cluster based testing will be performed after the pre-qualification.

The described test package architecture can be arranged to facilitate testing for the functionality and/or faults that might occur in any given cluster topology. It may be used to test any type of storage device, including disks, redundant arrays of independent disks, ("RAIDs") storage area networks ("SANs"), network attached storage devices ("NASs"), etc. The invention provides test suites for all types of storage devices, including storage devices that are directly attached to nodes and storage devices having storage subcomponents that provide intermediate connections, such as switches or hubs.

Comprehensive tests involving normal operation and various faults of the selected cluster topology can be wholly (or at least mainly) automatic, after a user has set up the testing process to a certain degree. The tests verify cluster software interaction with storage devices in normal scenarios (i.e., "no faults" cases) and in fault/failure scenarios. The fault scenarios can include node faults and storage faults. In addition, the normal scenario tests and fault injection tests can be performed in conjunction with multipathing faults. Accordingly, at least the following test scenarios may be implemented: (a) functional tests (no fault case); (b) node fault injection tests; (c) storage fault injection tests (e.g., powering off the storage device); (d) functional tests with multipathing faults; and (e) node fault injection tests with multipathing faults; (f) storage fault injection tests with multipathing faults. Other test types known by those of skill in the art can also be implemented.

It is important to ensure that any application accessing a storage device uses a consistent path across the cluster. This consistency is especially important for multihost disks because the local major and minor numbers for each device can vary from node to node. Also, the logical and physical device pathnames can vary from node to node. For example, node 1 might see a multihost disk as c1t2d0 and node 2 might see the same disk completely differently (e.g., as c3t2d0). Sun Cluster software normalizes these paths by using device IDs. This normalization allows applications and volume managers to reference multihost disks by using consistent naming.

Therefore, some implementations of the present invention include tests for validating the device ID information on a storage device to make sure each device has a unique device ID. Device ID testing, with and without multipathing, may also be performed in some implementations of the invention. In some embodiments, at least some of the test suites are designed to verify compliance with SCSI interfaces such as SCSI-2 and/or SCSI-3 interfaces. With the implementations described herein, the process of isolating bugs may be greatly simplified. Some such implementations further simplify this process by performing only those tests applicable to the functionality of a desired cluster, instead of the entire compliance verification test suite for SCSI-2 and/or SCSI-3.

As used herein, a distinction is made between the terms "cluster" (or "clustered system") and "cluster topology." A "cluster" is two or more computers that are connected and controlled in a manner such that they behave like a single computer. The term "cluster topology" refers to a particular relationship of interconnected computing nodes, storage devices and related components (e.g., switches, hubs, bus adapters, etc.). Only after the appropriate clustering software is added to the computing nodes will they behave as a "cluster." In the following description, storage devices are described as being connected to computing nodes in a cluster topology. This is meant to infer that the storage devices are connected to test computing nodes in the same manner (and with the same intermediaries, e.g., switches, hubs, bus adapters, etc.) as they might in a particular cluster. It does not necessarily infer that the computing nodes are connected to one another or otherwise configured in the same manner that they would in a cluster. Some embodiments of the present invention simulate cluster operations involving cluster interaction with storage subsystems under normal and fault scenarios without clustering software installed or running. Leaving the clustering software out greatly simplifies the testing process and therefore streamlines the process of storage device pre-qualification. Once the storage subsystem is validated, the process of performing a cluster qualification with cluster software is also simplified.

FIG. 1 is a block diagram that diagrammatically illustrates a simple test system that may be used to pre-qualify storage devices in accordance with one embodiment of the present invention. The topology illustrated in FIG. 1 is merely one simple example of a cluster topology that may be tested according to the invention: as noted above, any topology may be tested. In the illustrated embodiment, the test system 100 includes a pair of computing nodes 105, 110, a pair of storage devices 125 and 130 that are connected to the computing nodes in a cluster pair topology, and test administration machine 145. The computing nodes 105, 110 and test administration machine 145 may generally be any suitable computing systems. Typically, it is desirable to utilize the type of cluster machines that the storage devices are intended to be compatible with as the computing nodes, although this is not strictly a requirement. Also, it is generally preferable to use the same type of machine for each of the computing nodes, although again, this is not strictly a requirement. In the embodiment illustrated in FIG. 1, two computing nodes and two storage devices are shown. However, it should be appreciated that more nodes and/or more storage devices may be used in the test system. Notably, in many cases (e.g., to fully test SCSI-3 compatibility), it may be desirable to connect the storage devices to at least three computing nodes in an appropriate cluster topology.

The shared storage devices 125 and 130 may be any type of storage device that is intended to be cluster compatible. Test administration machine 145 runs software to control test system 100 for pre-qualifying storage devices according to the described implementations of the present invention. In this example, test machine 145 is a workstation, but test administration machine 145 may also be, for example, a server or a personal computer. Network 150 provides connectivity between the computing nodes 105, 110 and the test administration machine 145.

Some implementations of the invention provide methods and devices for testing storage devices and related subsystems for compatibility with a cluster topology that includes a plurality of computing nodes and at least one storage device. Some such methods involve the step of installing a test package on each of the plurality of computing nodes and executing at least some test cases of the test package. When executed, the test cases test the storage device and/or related subsystems under a plurality of scenarios that simulate events that can occur in a clustered computing environment. The test cases may be executed with or without clustering software installed for allowing the computing nodes to operate as a cluster. The scenarios may include fault and non-fault scenarios. The testing may be performed automatically, interactively, or a combination thereof.

The topology shown in FIG. 1 is sometimes referred to as a clustered pairs topology, in which a pair of computing nodes are each coupled to each of an associated pair of storage devices. In test system 100, node 105 is directly connected to storage devices 125 and 130 via connections 118 and 119, respectively. Similarly, node 110 is directly connected to storage devices 125 and 130 via connections 124 and 123, respectively. In alternative topologies, nodes may be connected to the storage devices through intermediary devices such as switches or hubs.

Node 105 includes host adaptors 116 and 117, which are typically private interface cards that are configured for connection with specific storage devices, switches and/or hubs. In SCSI devices, these controllers serve as the interface between all of the other devices on the SCSI bus and computing node(s). In different embodiments, these host adaptors can be cards that are plugged into available slots or they can be built into a motherboard.

Figure 2:
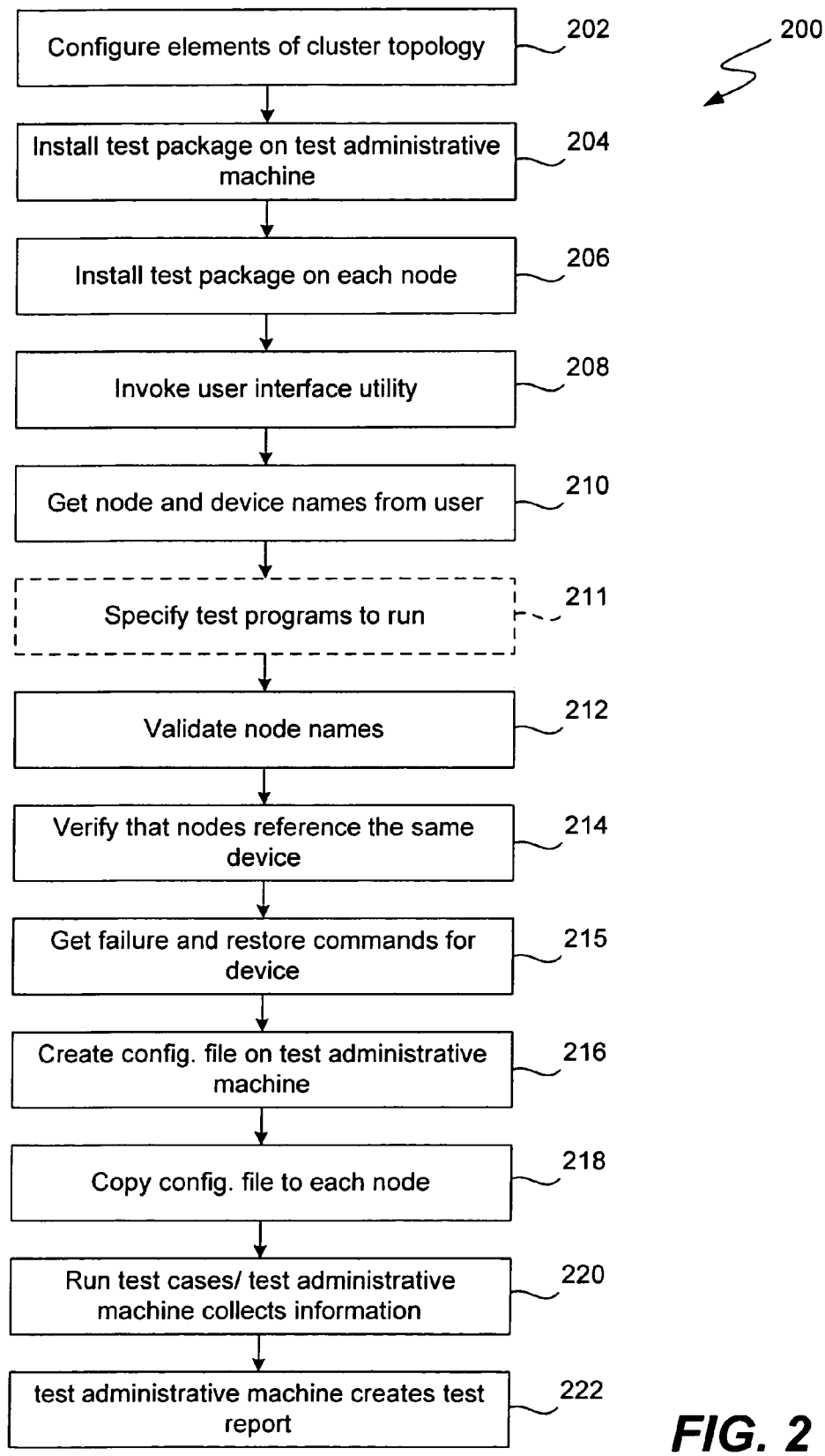
FIG. 2 is a flow chart that provides an overview of some methods of the invention.

FIG. 2 provides an overview of method 200 of pre-qualifying a storage device for cluster compatibility in accordance with one embodiment of the present invention and which will be described in more detail below with reference to FIGS. 3 through 7.

The first step of method 200 is to configure nodes, storage devices, etc., into a desired cluster topology (step 202). The topology may be a cluster pair topology, as illustrated in FIG. 1, or any other topology. For example, the topology may be an "N+1" topology, wherein one node is designated as a backup for all other nodes and all storage devices are connected to the backup node. The topology could also be an "N*N" topology, wherein each of storage devices is connected to every node and there are more than two computing nodes.

The next step is to install a test package on a test administrative machine, e.g., on test device 145 shown in FIG. 1 (step 204) and on each node of the cluster topology (step 206). The test package includes a number of test suites or test programs that are designed to simulate the interactions between cluster software running on the nodes and the storage subsystem, including fault scenarios. The fault scenarios may include node fault scenarios as well as storage fault scenarios. As used herein, the term "storage fault" includes faults of storage devices (hardware, software and firmware), switches and/or hubs, the node host adaptors and all connections between the foregoing elements. In the described embodiment, the test suite includes both SCSI-2 and SCSI-3 testing, with and without node and storage faults, and with and without multipathing faults.

The software for controlling the cluster as it will ultimately be controlled (e.g., SunCluster™ software) is preferably not installed while these tests are running, because the software could introduce unnecessary complications into the testing process. As noted above, the test suites will simulate operations involving interaction between cluster software running on the nodes and the storage subsystem.

After the test package has been installed on all of the appropriate machines in the test system, a test administration package invokes test user interface utility 166 on the test administration machine 145 (see FIG. 1) to identify and dispatch the desired test suites (step 208). In this example, the first substantive step of the user interface utility is to get node and storage device names, as well as the storage device connectivity from the user that is managing the tests (step 210). This may be accomplished in any suitable manner, as for example by prompting the user to make keyboard entries, by providing the device names as arguments in a test user interface utility, etc. The storage device names may be provided in any suitable form, as for example by the names as they are seen by each node. One suitable method for obtaining the required node and storage device information is described in more detail below with respect to FIG. 5.

In step 211, the test user interface utility obtains the identity of the test suites or test programs to be run. This can be obtained by prompting a user to specify which test programs to run, as part of a command or in any other suitable manner. In the event that the user does not affirmatively select the tests to be run, an appropriate default grouping of test suites (e.g. all) may be selected. It should be appreciated that the specific tests that a user may want to run at any time may vary widely based on the needs at a particular time. In some circumstances, it will be desirable to run all of the test suites in the test package at the same time. In other circumstances, it may be desirable to run a single test suite, a few individual test suites or a predefined group of test suites, etc. Thus, the user is given the opportunity to define the specific test suites that they would like to run. In practice, it is often desirable to logically organize the test suites into functional groups of tests that a user may want to run as a group. One such group would typically be "all" test suites. In one specific example, the set of program groups might include such groups as: "functional" tests that are designed to test specific functionalities of the storage devices without the intentional introduction of faults during the testing; "fault injection" tests which are designed simulate faults (such as a system reboot, a component failure, etc.) that can occur during cluster computing; "multipathing fault" tests without system fault injection; and "multipathing fault" tests with system fault injection.

An alternative way to group the test suites might be: (1) non-fault tests; (2) node fault tests; (3) storage fault tests (both multipathing and non-multipathing); and (4) storage and node fault tests (both multipathing and non-multipathing). As noted above, "storage fault" includes faults of storage devices (hardware, software and firmware), switches and/or hubs, the node host adaptors and all connections between the foregoing elements. An alternative grouping of test suites is as follows: (1) functional tests (no fault case); (2) node fault injection tests; (3) storage fault injection tests; (4) functional tests with multipathing faults; and (5) node fault injection tests with multipathing faults; (6) storage fault injection tests with multipathing faults.

It should be apparent that the test package developer may utilize any categorization scheme he or she believes to be appropriate, including hierarchical groupings. The user may select the test programs via any means known by those of skill in the art, e.g., via a mouse click on a GUI, via keyboard entry, etc.

After the desired test programs have been identified, the node names received from the user are validated by the test suite (step 212). This can be accomplished by simply pinging the identified nodes to verify that they exist and are in communication with the test administration machine. After the nodes have been identified, the test suite verifies that the various nodes are actually referencing the storage devices that they are supposed to be in contact with (step 214). One suitable approach for validating the node names and verifying the connections is described in more detail below with respect to FIG. 6.

Each test of the test suite that involves storage faults and multipathing faults requires a method for "injecting" or causing the fault and a method for recovering from the fault ("restoring"). Therefore, after the connections have been verified as described above, any required failure and restore commands are obtained.

Injecting the fault and restoring can be done in at least two different ways. According to one such method, the fault can be injected in an automated way as part of the test by invoking a user-supplied command. In other words, the user needs to specify the command, tool or program that can be used to inject a storage fault or multipathing fault. The test program will automatically use that command/tool/program to inject the fault. The user also needs to specify the command/tool/program that can be used to restore the system from the storage fault or multipathing fault that was injected. At the end of the test, the test program restores the system automatically by invoking the user-specified command. According to this method, fault injection and recovery are performed in an automated way without any user interaction. All the user does is to provide two commands/tools, the first to inject the fault and the second to recover from the fault. In some implementations, failure and restore commands are obtained for the storage device (step 215).

If the user does not provide tools or commands to inject the fault as described above, the test framework will recognize this. In some such cases, all the steps in the test will be run in an automated way except for the steps involving injecting and recovering from faults. For example, the test could automatically open a storage device and invoke an operation between a node and the storage device (e.g., a SCSI-2 or SCSI-3 operation. Then, if no commands are obtained in step 215, the test program goes into an interactive mode (step 220) and obtains commands from the user.

For example, the test framework may interactively prompt the user to inject a fault manually. Once user injects the fault manually and indicates that he or she has injected the fault (e.g., by pressing a key), the test will proceed to other steps in an automated way. In this example, when the test comes to the step involving recovery from the fault, it will interactively prompt the user to restore the fault manually and press a key. When user presses a key, the test program will proceed further to perform other steps in the test in an automated way.

A configuration file is then created for the test administrative machine (step 216), which is copied to each node (step 218). The configuration file includes a complete listing of all of the configuration information that has been obtained, including the names of each of the computing nodes and their associated connection topology, including an indication of how each storage device is coupled to its associated nodes. It also includes an indication of the failure and restore commands.

The tests are then ready to be run according to the configuration of the desired cluster. As the tests are run, the test administrative machine collects information regarding the test results (step 220) and generates a report when testing is complete (step 222).

Figure 5:
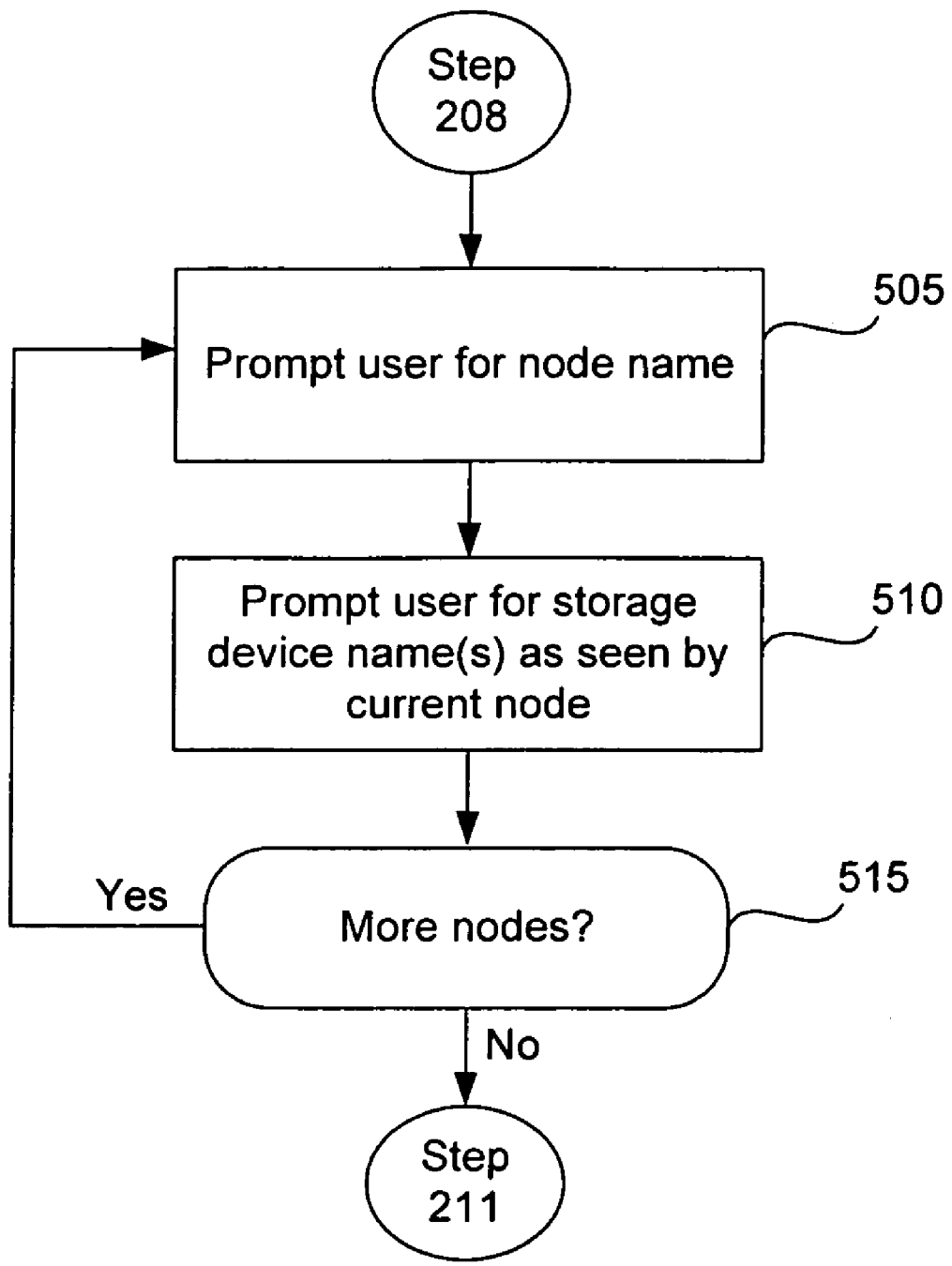
FIG. 5 is a flow chart illustrating one suitable approach for obtaining computing node and storage device configuration information (step 210 of FIG. 2), according to one embodiment of the invention.

Referring next to FIG. 5, one appropriate method of obtaining computing node and storage device information (step 210 of FIG. 2) will be described in more detail below. In step 505, the user is prompted to enter the name of one of the computing nodes (referred to as the current node). After receiving an appropriate node name, the user is prompted for the names of each of the storage device(s) to which the node is connected, as seen by the current node (step 510). After the names of the storage devices are obtained, the system logically determine whether there are more nodes (as represented by step 515). If so, the process returns to step 505 where the user is prompted to enter the name of the next computing node and the process is repeated. If not, the process proceeds to step 211 of FIG. 2 where an indication of the test suites to be run is obtained.

Figure 6:
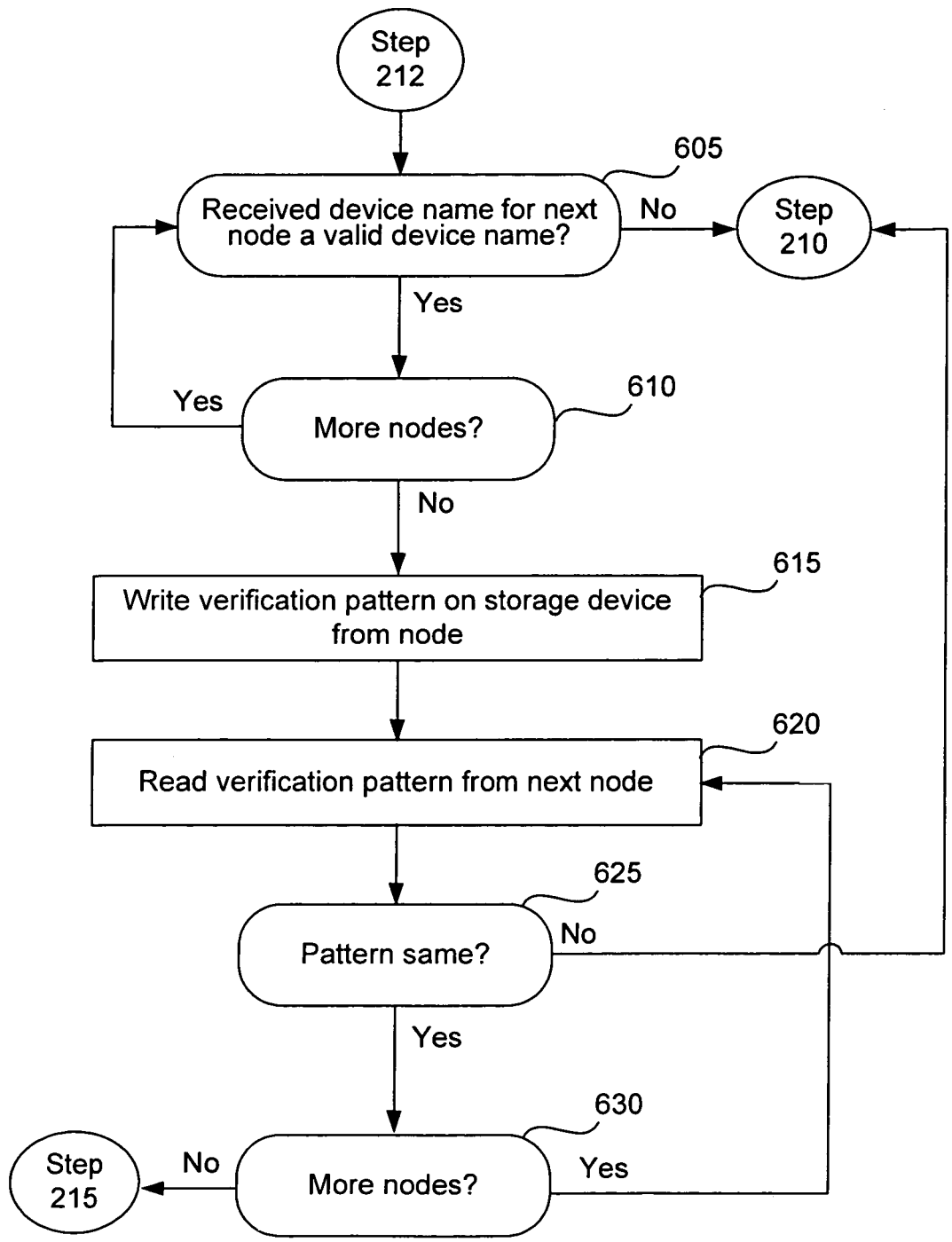
FIG. 6 is a flow chart illustrating one suitable approach for verifying that the computing nodes are connected to the appropriate storage device for the tests (step 214 of FIG. 2), according to one embodiment of the invention.

Referring next to FIG. 6, one suitable approach for validating the nodes and verifying that the computing nodes are connected to the appropriate storage device for the tests (steps 212 and 214 of FIG. 2) will be described in more detail. This described embodiment is suitable for use in situation where each computing node is connected to a single storage device. In step 605, it is determined whether the received storage device name for the node under consideration is a valid storage device name. This determination is made by attempting to access the storage device from the node. If the device can be accessed, it is assumed that the storage device name is valid. If the device cannot be accessed, it is assumed that there is a problem with the storage device name that was provided. This could be because the name given was incorrect, that the named storage device was not connected properly or down or due to a variety of other potential problems. If the device cannot be verified, the process logically returns to step 210 of FIG. 2 where the user is informed of the problem and asked to provide the correct name and/or fix any connection problems that may exist. After a storage device has been validated, the same process is repeated for each of the identified storage devices as diagrammatically represented by the decision block 610.

After all of the storage devices have been validated, a unique verification pattern is written by a first one of the nodes onto the storage device (step 615), then the verification pattern is read from the next node (step 620). If the read verification pattern is not the same, the first and second nodes are apparently not accessing the same device and the user is informed of the problem and the logic effectively returns to step 210 where the user is prompted or otherwise requested to provide the correct device name. Alternatively, if the read verification pattern is the same, it is assumed that the nodes are accessing the same storage device. If there are any additional computing nodes that are intended to access the same storage device, then the pattern reading process is repeated for each of the other nodes that is intended to access the storage device as graphically illustrated by decision block 630. Once all of the nodes have been checked to verify that they are accessing the same storage device, the logic continues to step 215 as described above.

It should be appreciated that this storage device verification process is useful in many situations because some computing systems use storage device naming conventions that are dependent on characteristics of the node itself. Therefore, two nodes that are connected to the same storage device might utilize different names to reference the storage device. For example, some naming conventions might incorporate the local host bus adaptor number that the storage device is connected to as part of the storage device name. Therefore, it cannot be assumed that if two different nodes try to reference a storage device using the same name that they will actually be accessing the same device.

Figure 7:
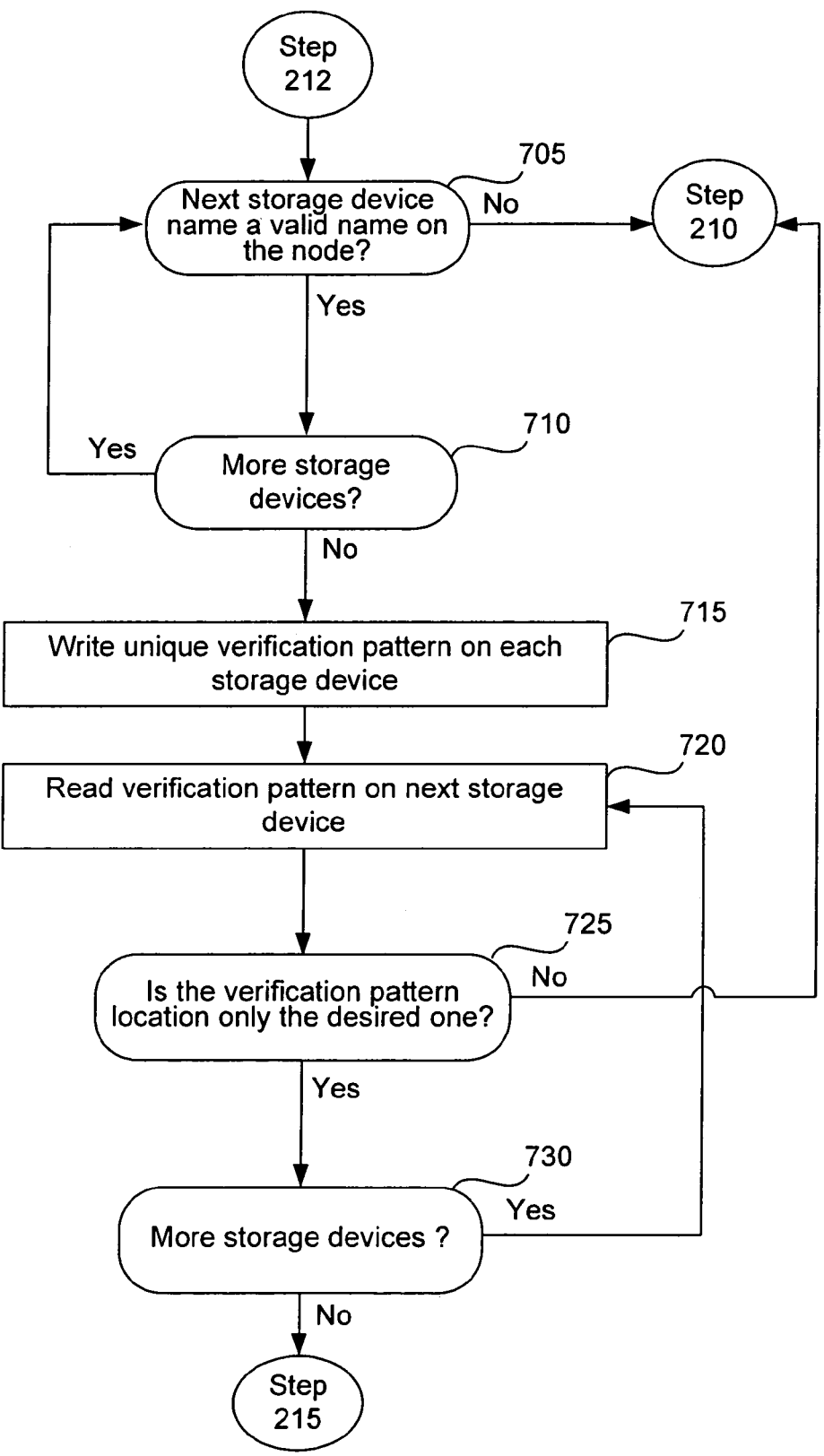
FIG. 7 is a flow chart illustrating another suitable approach for verifying that the computing nodes are connected to the proper storage device that is particularly appropriate when at least one of the selected test suites include device ID testing (step 214 of FIG. 2), according to one embodiment of the invention.

FIG. 7 illustrates an alternative method of verifying that the computing storage device (214 of FIG. 2) in a manner suitable to test device IDs. FIG. 7 may apply, for example, when a node is connected to multiple storage devices. In this embodiment, it is first determined whether the next storage device name is a valid name (step 705) on the node. If not, the device name associated with the node is wrong, the user is so informed and the logic conceptually returns to step 210. This process is repeated for each storage device connected to the node as diagrammatically represented by the loop formed by decision block 710.

After all of the device names have been verified, a unique verification pattern is written on each storage device in a distinct location (step 715). That is, a first verification pattern is written at a first location on the first storage device, a second verification pattern is written at a second location on the second storage device, etc. Thereafter, each computing node reads the verification patterns for each of the storage devices that it is connected to. This reading step is conceptually illustrated by the loop of steps 720 to 730. If all of the storage devices are properly connected, properly named and properly functioning, then each storage device will have a single verification pattern that is located at the desired location.

However, if there is a problem with the system, the problem can be detected by reading the verifications patterns. For example, if the node writing a verification pattern actually accesses the same storage device when it thinks it is accessing two different storage devices, this will become apparent when reading the verification patterns because two different verification patterns will appear at different locations on the storage device that it actually accesses. If a storage device doesn't have any verification patterns written thereon when it is read, then it will be apparent that one of the writing or reading nodes is not connected in the intended manner. If any problems are detected when reading the verification patterns, then the user is informed of the problem and prompted to check the connections and/or provide the correct device name information, thereby logically returning to step 210 of FIG. 2. If all of the verification patterns that have been read (720) check out properly (725), the verification is completed and the logic continues to step 215.

As discussed above, the test suites that make up the test package can be designed to test the functionalities that a cluster is likely to expect of the storage device, both stand alone and in the context of a variety of contemplated fault scenarios. It should be appreciated that the specific functionalities and fault scenarios tested will depend in large part on the nature of the cluster the storage devices are intended to work with and the ability of the test suite designer to predict the functional needs of the user and the potential fault scenarios.

A number of fault scenarios contemplate various types of node faults. FIGS. 3 and 4 diagrammatically depict a couple of common node fault scenarios. In FIG. 3, node 305 has failed or is otherwise malfunctioning. In such a circumstance, it is typically desirable to "fence" or protect storage device 320 from node 305, so that node 305 can no longer access storage device 320. If storage device 320 is connected to only two nodes, SCSI-2 or SCSI-3 may be used to implement fencing. If storage device 320 is connected to more than two nodes, SCSI-3 may be used to implement fencing.

Accordingly, the described implementations of the invention simulate node fault and fencing scenarios using SCSI-2 and SCSI-3 as they are used in a real cluster environment. For example, some implementations simulate node failure and invoke the "MHIOCTKOWN" command (in the case of SCSI-2) from the node. The node that is issuing the MHIOCTKOWN command is expected to be the one with the reservation and should have read/write access to the storage device. The other nodes should not have access to the storage device. "MHIOCSTATUS" can then be issued from various nodes to verify whether or not they have access to the storage device.

In cluster topology 400 of FIG. 4, there is a fault in connection 415 between nodes 405 and 410. When such a fault occurs, storage device 420 should no longer be accessible to both of nodes 405 and 410. Therefore, some clustered systems implement a "quorum" procedure for determining access to storage device 420. In this example, the quorum procedure would involve a race between nodes 405 and 410: whichever node accesses storage device 420 first is granted access to the storage device.

Accordingly, some implementations of the invention simulate quorum scenarios using SCSI-2 and SCSI-3 with fault injection. For example, some implementations simulate node connection failure and then run simultaneous "MHIOCTKOWN" commands from the nodes of the cluster topology. Then, a "STATUS" command is run to indicate which node owns the storage device.

OTHER EMBODIMENTS

Generally, the techniques of the present invention may be implemented on software and/or hardware. For example, they can be implemented in a separate user process, in a library package bound into network applications, on a specially constructed machine, or on a network interface card. In a specific embodiment of this invention, the technique of the present invention is implemented in software.

A software or software/hardware hybrid implementation of the techniques of this invention may be implemented on a general-purpose programmable machine selectively activated or reconfigured by a computer program stored in memory. Such a programmable machine may be a network device designed to handle network traffic. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Because such information and program instructions may be employed to implement the systems/methods described herein, the present invention relates to machine-readable media that include program instructions, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application.

For example, although the invention has been described primarily in the context of testing storage products for use in multi-node clusters, it should be appreciated that the invention can be applied to test other types of devices (e.g., switches, interface cards, etc.) for use in clusters. The test cases simulated can be arranged to test any desired clustering topology (including single node clusters) including cluster topologies having a single storage device or multiple storage devices. The invention can also be applied to test a wide variety of other distributed computing systems.

The number of test suites or test scenarios that are included in any particular test package may be widely varied, however for simplicity and modularity it is often desirable to limit each test suite to testing one or a small number of particular functionalities. By way of example, one implementation of the test according to the present invention may include on the order of 100 test scenarios for SCSI-2, 200 for SCSI-3 and 10 (or fewer) device ID tests. For example, the SCSI-2 tests may include on the order of 20 non-reboot tests, 20 reboot tests, 20 multipathing fault tests, 20 multipathing fault with reboot tests (interactively and automated), etc. These numbers are merely rough approximations: one of skill in the art will appreciate that the number of tests depends on the configuration and topology of the cluster, including the number of nodes, storage devices, connections, etc.

Some implementations of the invention allow test suites or test scenarios to be run when clustering software is installed for controlling a cluster topology. In some such implementations, clustering software is installed but the machines of the cluster topology are not booted in cluster mode. In other implementations, clustering software is installed and the machines of the cluster topology are booted in cluster mode. In some such cases, when the test suites or test scenarios are invoked, they bypass the clustering software.

Accordingly, the present embodiments are to be considered as illustrative and not restrictive, and the invention is not to be limited to the details given herein, but may be modified within the scope and equivalents of the appended claims.

I claim:

1. A method of testing a storage device for compatibility with a cluster using a test system that includes a plurality of computing nodes and at least one storage device that are connected in a clustering topology, the method comprising:
installing a test package on each of the plurality of computing nodes, the test package including a plurality of test cases for testing the at least one storage device under a plurality of scenarios that simulate events that can occur in a clustered computing environment; and
executing at least some of the test cases, wherein the executed test cases are executed without the computing nodes operating as a cluster;
wherein the scenarios include the following fault scenarios: node fault scenarios; storage fault scenarios; and multipathing fault scenarios.

2. A method as recited in claim 1 wherein:
the scenarios include fault and non-fault scenarios; and
the testing is performed substantially automatically by running the test package.

3. The method of claim 2, further comprising the step of obtaining node and storage device names from a user and obtaining an indication of the test cases to be executed from the user.

4. The method of claim 3, comprising validating the node and storage device names.

5. A method as recited in claim 1, wherein the test package comprises a plurality of test cases for verifying that the at least one storage device properly implements at least one of SCSI-2 and SCSI-3 interfaces applicable to the functionality of a desired cluster.

6. The method of claim 1, wherein the cluster topology comprises a plurality of storage devices and wherein at least some of the plurality of test cases test each storage device of the plurality of storage devices.

7. The method of claim 1, further comprising the selection, by a user, of a subset of the plurality of test cases.

8. The method of claim 1, further comprising the step of automatically creating a test report that provides results of the test cases that are executed.

9. The method of claim 1, wherein the step of executing at least some of the test cases comprises injecting and restoring faults in an interactive manner.

10. The method of claim 1, wherein the cluster topology further comprises a storage subcomponent connected for communication between the plurality of nodes and the at least one storage device, and wherein the fault scenarios comprise storage subcomponent fault scenarios and scenarios involving faults in communication between the plurality of nodes and the at least one storage device.

11. The method of claim 10, wherein the storage subcomponent comprises a hub or a switch.

12. A method of testing a storage device for compatibility with a cluster using a test system that includes a plurality of computing nodes and at least one storage device that are connected in a clustering topology, the method comprising:
installing a test package on each of the plurality of computing nodes, the test package including a plurality of test cases for testing the at least one storage device under a plurality of scenarios that simulate events that can occur in a clustered computing environment; and
executing at least some of the test cases, wherein the executed test cases are executed without the computing nodes operating as a cluster; and
validating node and storage device names;
wherein the step of executing at least some of the test cases comprises injecting and restoring faults in an interactive manner.

13. A method of testing storage devices, the method comprising:
connecting a plurality of computing nodes and at least one storage device to form a cluster topology;
installing a test package on a test administration machine in communication with the computing nodes, the test package comprising a plurality of test cases for verifying that the at least one storage device properly implements SCSI-2 and SCSI-3 interfaces; installing the test package on each node in the plurality of nodes; and automatically testing the at least one storage device for at least one of SCSI-2 and SCSI-3 compatibility by running the test package.

14. The method of claim 13, wherein the testing step is performed without clustering software installed for controlling the cluster topology.

15. The method of claim 13, wherein the testing step is performed with clustering software installed for controlling the cluster topology.

16. A computer program stored on a machine-readable medium, the computer program comprising commands for controlling a plurality of nodes in a cluster topology and at least one storage device in communication with the plurality of nodes in the cluster topology to simulate a plurality of scenarios, the scenarios including fault and non-fault scenarios, wherein the fault scenarios comprise multipathing fault scenarios, for automatically testing the at least one storage device.

17. The computer program of claim 16, wherein the fault scenarios further comprise node fault scenarios.

18. The computer program of claim 16, wherein the fault scenarios further comprise storage fault scenarios.

19. The computer program of claim 16, wherein the cluster topology comprises a plurality of storage devices and wherein a portion of the commands tests each storage device of the plurality of storage devices.

20. The computer program of claim 16, further comprising commands for enabling a user interface to allow the selection of a subset of the plurality of scenarios.

21. The computer program of claim 16, further comprising commands for controlling a device to automatically create a test report.

22. The computer program of claim 16, further comprising commands for controlling a device to obtain node and storage device names.

23. The computer program of claim 16, wherein the plurality of scenarios verifies that the at least one storage device properly implements SCSI-2 and SCSI-3 interfaces.

24. The computer program of claim 16, wherein the scenarios simulate cluster software interaction between a node and at least one storage device.

* * * * *